United States Patent
Bartek et al.

(10) Patent No.: US 9,158,746 B2
(45) Date of Patent: Oct. 13, 2015

(54) MANAGING CONCURRENT EDITING IN A COLLABORATIVE EDITING ENVIRONMENT USING CURSOR PROXIMITY AND A DELAY

(75) Inventors: Velda Bartek, Apex, NC (US); Eric L. Masselle, Raleigh, NC (US); Patrick G. McGowan, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 13/495,323

(22) Filed: Jun. 13, 2012

(65) Prior Publication Data

US 2013/0339847 A1    Dec. 19, 2013

(51) Int. Cl.
 *G06F 15/00* (2006.01)
 *G06F 17/24* (2006.01)
 *G06Q 10/10* (2012.01)

(52) U.S. Cl.
 CPC ............... *G06F 17/24* (2013.01); *G06Q 10/10* (2013.01)

(58) Field of Classification Search
 CPC ......... G06F 3/048; G06F 15/62; G06F 15/00; G06F 17/24; G06Q 10/10
 USPC ............................ 715/255, 751, 755, 742, 234
 See application file for complete search history.

(56) References Cited

U.S. PATENT DOCUMENTS

| | | | | |
|---|---|---|---|---|
| 5,337,407 A * | 8/1994 | Bates et al. | ................... | 715/751 |
| 5,339,388 A * | 8/1994 | Bates et al. | ................... | 715/742 |
| 5,339,389 A * | 8/1994 | Bates et al. | ................... | 715/742 |
| 5,877,766 A * | 3/1999 | Bates et al. | ................... | 715/854 |
| 6,049,334 A * | 4/2000 | Bates et al. | ................... | 715/755 |
| 7,124,362 B2 * | 10/2006 | Tischer | ......................... | 715/255 |
| 7,249,314 B2 * | 7/2007 | Walker et al. | ................. | 715/205 |
| 7,694,220 B2 | 4/2010 | Kawano | | |
| 7,849,401 B2 * | 12/2010 | Elza et al. | ...................... | 715/234 |
| 7,949,633 B1 | 5/2011 | Shaver et al. | | |
| 7,954,043 B2 | 5/2011 | Bera | | |
| 2009/0094242 A1 | 4/2009 | Lo et al. | | |
| 2009/0249257 A1 * | 10/2009 | Bove et al. | ...................... | 715/858 |
| 2010/0281007 A1 | 11/2010 | Bailor et al. | | |

OTHER PUBLICATIONS

Zhifang Li et al. "An Adaptive-Granularity Locking Algorithm and Its Application in Collaborative Authoring System". 11th International Conference on Computer Supported Cooperative Work in Design, Apr. 26-28, 2007. pp. 168-173. Publication Year: 2007. Digital Object Identifier: 10.1109/CSCWD.2007.4281429.

\* cited by examiner

*Primary Examiner* — Cesar Paula
*Assistant Examiner* — Jian Huang
(74) *Attorney, Agent, or Firm* — Noah A. Sharkan

(57) ABSTRACT

A system, method and program product for managing concurrent editing in a collaborative editing environment includes a step of a computer receiving an input to edit an electronic document from a first editor through a first user interface. Responsive to receiving an input to edit an electronic document, the computer tracks a cursor within the electronic document associated with the first editor. The computer locks content of the electronic document within a predetermined proximity of the cursor associated with the first user interface to prevent access to the content of the electronic document within the predetermined proximity of the cursor by one or more second editors. Responsive to the cursor associated with the first editor moving to a new location within the electronic document, the computer unlocks content no longer in the predetermined proximity of the cursor associated with the first editor.

17 Claims, 3 Drawing Sheets

MANAGING CONCURRENT EDITING IN A COLLABORATIVE EDITING ENVIRONMENT USING CURSOR PROXIMITY AND A DELAY

FIELD OF THE INVENTION

The present invention relates generally to document development and more specifically to managing concurrent editing in a collaborative editing environment.

BACKGROUND

Collaborative or simultaneous document editing applications permit multiple users to simultaneously access and coauthor a document. The editing applications allow multiple users to edit the document concurrently. However, redundant or contradictory editing occurs when a document is accessible to multiple users at the same time. In many cases, more than one user will find the same problem and edit the document regarding the same issue. Furthermore, in some cases, two or more users may attempt to edit the same content of the document at the same time, resulting in contradictory editing within the document. Redundant and contradictory editing may be both time-consuming and a substantial waste of resources.

When concurrent contradictory editing occurs in the same content, adverse issues may materialize, such as continuous editing or a conflict loop that produces an instance where more than one user continues making a change that is undone by the other user at substantially the same time. Furthermore, in some instances, the more users that are concurrently editing a document, the more likely that users will edit the same content at substantially the same time, causing problems during the collaborative editing process.

SUMMARY

Aspects of the present invention disclose a method, system and program product for managing concurrent editing in a collaborative editing environment.

A system, method and program product for managing concurrent editing in a collaborative editing environment includes a step of a computer receiving an input to edit an electronic document from a first editor through a first user interface. Responsive to receiving an input to edit an electronic document, the computer tracks a cursor within the electronic document associated with the first editor. The computer locks content of the electronic document within a predetermined proximity of the cursor associated with the first user interface to prevent access to the content of the electronic document within the predetermined proximity of the cursor by one or more second editors. Responsive to the cursor associated with the first editor moving to a new location within the electronic document, the computer unlocks content no longer in the predetermined proximity of the cursor associated with the first editor.

DETAILED DESCRIPTION

Figure 1:
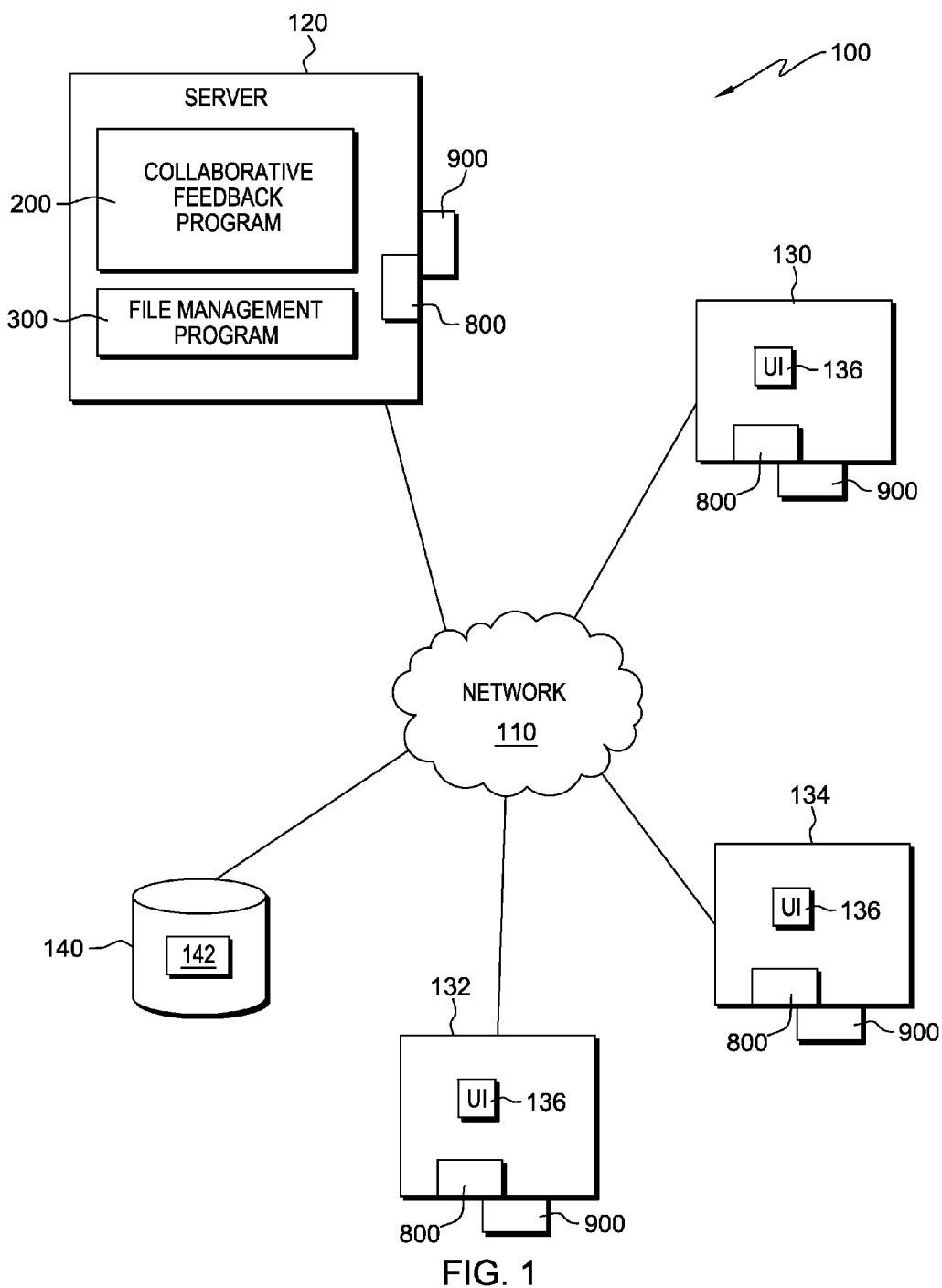
FIG. 1 depicts a document collaboration system for managing concurrent editing in a collaborative editing environment according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention will now be described in detail with reference to the figures. FIG. 1 illustrates a document collaboration system, generally designated 100, according to one embodiment of the present invention.

Document collaboration system 100 includes a network 110, a server computer 120, multiple client computers, such as client computers 130, 132, and 134, and a network storage device 140 containing a file repository 142. In the depicted example, network 110 is the Internet representing a worldwide collection of networks and gateways that use the Transmission Control Protocol/Internet Protocol suite of protocols to communicate with one another. In other examples, network 110 may also be implemented as a number of different types of networks, such as, but not limited to an intranet, a local area network (LAN), or a wide area network (WAN). Examples of network 110 include wire cables, wireless communication links, fiber optic cables, routers, switches, and/or firewalls. Server computer 120, client computers 130, 132, and 134, and network storage device 140 are interconnected by network 110.

Server computer 120 may be, for example, a management server, a web server, or any other electronic device or computer system capable of receiving and sending data. In another embodiment, server computer 120 represents a "cloud" of computers interconnected by one or more networks, where server computer 120 is a primary server for a computer system utilizing clustered computers and components to act as a single pool of seamless resources when accessed through network 110. This is a common implementation for data centers in addition to cloud computing applications. Client computers 130, 132 and 134 are clients to server computer 120 and may be, for example, a notebook, a laptop computer, a tablet computer, a handheld device or smart-phone, a thin client, or any other electronic device or computing system capable of communicating with server computer 120 through network 110.

Server computer executes collaborative feedback program 200 for managing concurrent editing in a collaborative editing environment. Collaborative feedback program 200 applies a temporary lock that suspends the ability of editors to edit content of a section of a document which is concurrently being edited by another editor. The scope and duration of the temporary lock may be influenced by a number of parameters, including, but not limited to: a user role, document type, content type, number of users in a current editing session, and the originating user of the content of the document.

In an example, the collaborative feedback program 200 applies the temporary lock to the editing capabilities for additional editors to edit content of a section of the document which is currently being edited by another editor. In an example, an editor opens a document stored in the file repository 142 of the network storage device 140 using a client computer. The document is displayed on the client computer in a format that the editor may input edits within the document. One or more second editors may open and display the document in a similar fashion on additional client computers. The collaborative feedback program 200 tracks a location and an order of the editing of content by each editor during a collaborative editing session of the document. As each editor begins editing content of the document, a temporary lock is applied to the content of the document within close proximity of the cursor associated with each editor that does not allow any other editor to edit the content when the collaborative feedback program 200 determines that the scope and/or timing of the edits of the editor conflict with edits provided by any other editor. Depending upon static or dynamic rules, the collaborative feedback program 200 temporarily locks content of the document to different editors.

In another example, the collaborative feedback program 200 temporarily locks content in the document that surrounds an area around where the editor is currently editing within the document. The collaborative feedback program 200 tracks where each editor is currently editing within the document by tracking the cursor position within the document displayed on the client computer associated with each editor. If more than one editor attempts to edit the document within a predetermined area, the collaborative feedback program 200 locks out all but one of the editors based on predetermined rules established to prohibit more than one editor to edit the same content of a document concurrently. The collaborative feedback program 200 highlights the content of the document that is locked to additional editors, so as to warn the additional editors that an editor is currently editing a portion of the content of the document. However, in some examples, the content that the editor currently editing is not highlighted on the display depicted to the editor currently editing the content, but the content is highlighted on the display for all other editors that are locked out from editing the content.

In this example, a first editor changes content within the document that is within a protected zone or area around where the cursor associated with the first editor is positioned within the document. Other editors are locked out of editing within the protected zone or area around where the cursor associated with the first editor is positioned within the document. The other editors are locked out from editing the content in the protected zone or area of the content of the document for a predetermined time. Before the content located within the protected zone associated with the first editor is able to be edited by the other editors, the collaborative feedback program 200 saves the content of the document that has been edited by the first editor.

In some examples, locking of the content within the document would follow static rules set in a predetermined sequence. In one example, the collaborative feedback program 200 tracks the location of the cursor associated with each editor and locks the content around the cursor associated with each editor for a predetermined set of time, such as ten seconds. Once the cursor of the editor moves to another location within the document, the content of the document that was edited by the editor is saved in the file repository 142. The collaborative feedback program 200 unlocks the content that was locked, and the previously locked content is now free to be edited by other editors.

The collaborative feedback program 200 highlights the content of the document that is locked to additional editors, so as to warn the additional editors that an editor is currently editing a portion of the content of the document, and/or to display to the additional editors how long the additional editors are locked from editing the content of the document that is locked. However, in some examples, the content that the editor currently editing is not highlighted in the display depicted to the editor currently editing the content, but the content is highlighted in the display for all other editors that are locked out from editing the content. In exemplary embodiments, collaborative feedback program 200 may utilize standard or conventional models to warn the additional editors that an editor is currently editing a portion of the content of the document, and/or to display to the additional editors how long the additional editors are locked from editing the content of the document that is locked. Examples include, but are not limited to: changing the cursor to an hourglass, changing the color of the content of the document that is currently locked (e.g. changing the text and/or background color), or producing a pop-up or in-line dialog.

In some examples, locking of the content within the document would follow dynamic rules set in a predetermined sequence. Many different examples of dynamic rules may be set to facilitate the locking of content within the document.

In an example, the number of editors that are currently editing the document affects the length or the breadth of the content locked out by other editors imposed by the collaborative feedback program 200. As the number of editors currently editing the document increases, the longer the length or the breadth of the content locked for an editor, as there is an increased likelihood that more than one editor may want to edit the same content of the document. In another example, the order by which the editors enter a first edit within the document establishes a ranking system that may be utilized. In one scenario, the earlier that an editor generates a first edit, the less corresponding delay that occurs before other editors may access the edited content of the document.

In an example, the order by which the editors have editing preference is determined by user rankings. In one scenario, the editors are a part of a community that tracks the importance or credibility of each editor. The editors with the highest community ranking that correlates to importance, credibility, etc., have editing preference over other editors. When multiple editors are concurrently editing the document, the editors with the higher community ranking are able to edit portions of the document before editors with the lower community ranking.

In an example, the order by which the editors have editing preference is determined by a user role of the editors. In one scenario, the editors may be classified as owners of the document, editors of the document, and reviewers of the document. The owners have editing preference over the editors of the document and the reviewers of the document.

In an example, the amount of delay and the scope of the lock imposed on editors having the ability to edit a portion of content that has just been edited by another editor is at least related to the nested object relationship. In one scenario, if the edit is to a word within a sentence that is within a paragraph, the amount of delay imposed on editors is the longest at the word-level, shorter at the sentence-level, and shorter yet at the paragraph-level.

In an example, the amount of delay and the scope of the lock imposed on editors having the ability to edit a portion of the content that has just been edited by another editor is at least related to the object type of the content. In one scenario, the cells located in a spreadsheet of a document may have a longer delay than a sentence within the same document.

In an example, the amount of delay imposed on editors having the ability to edit a portion of the content that has just been edited by another editor is at least related to the type of content. In one scenario, the cell of a spreadsheet with a complex formula receives a longer delay than a cell of a spreadsheet with a simple text string.

In an example, the amount of delay imposed on editors having the ability to edit a portion of the content that has just been edited by another editor is at least related to the type of document being edited. In one scenario, a document that is classified as a research paper uses a certain set of dynamic rules, utilizing any of the examples that are listed and/or alternatives. Another document is classified as a business plan and utilizes a different set of dynamic rules, utilizing any of the examples that are listed and/or alternatives.

In an example, the amount of delay imposed on editors having the ability to edit a portion of the content that has just been edited by another editor is at least related to the phase of the document in the drafting and/or editing process. In one scenario, in a collaborative document system with work flow capabilities, a document in an initial draft phase follows a first rule set that regulates the hierarchy of editing within the document. When the document changes from the initial draft phase, a new set of rules regulates the hierarchy of editing within the document.

In an example, the amount of delay imposed on editors having the ability to edit a portion of the content that has just been edited by another editor is at least related to the editing behavior of each editor. In one scenario, if collective feedback program 200 detects that the length of the editing delay is insufficient, the delay could automatically be extended or reduced by some factor. Collective feedback program 200 may detect insufficient delay in a variety of ways, such as, but not limited to the instance where edited content within a predetermined zone is edited by more than one person, collective feedback program may determine that two editors are overwriting each other before either editor can complete an edit.

Different examples of collective feedback program 200 may lock out editors from at least two perspectives, and/or a combination of the two perspectives. In a first perspective, editors are locked out of a portion of the content of the document depending upon a duration of time from when an initial editor generates an edit within the document. In a second perspective, the period of delay for an editor relates to the editor attempting to edit in the portion of content of the document. In another example, the two perspectives are combined so that both the period or delay of locking out of a portion of the document and the period of delay locking out the individual editors are considered in determining if and when an individual editor can initiate editing within a portion of a document.

In an example that utilizes a combination of the two aforementioned perspectives, a first user initiates editing within a document. Collaborative feedback program 200 determines that the sentence the first user is editing within is locked so that other users are unable to edit within that sentence. In this scenario, the first user is the owner of the document and the first user has a locking period or delay of five seconds, (i.e., while the first user is actively editing within the document, the current sentence within the document is locked for the length of the editing period plus an additional five seconds after the last edit, so that no other user may edit within that sentence). A second user and a third user simultaneously attempt to edit the sentence that the first user has locked approximately one second after the first user is finished editing the sentence. The second user is designated an editor of the document and has a locking period or delay of three seconds, and the third user is designated a reviewer of the document and has a locking period or delay of six seconds. Although the second and third users initiated editing simultaneously, the second user has a shorter locking period or delay. Therefore, the second user has an editing privilege before the third user. However, the second user still has to wait until the locking period has run for the first user. In this example, the first user still has a locking period of five seconds, so the second user has to wait until that locking period ends before the second user has the ability to edit the sentence. The third user is set as the next editor to have the ability to edit the sentence of the document, but this occurs only after the second editor begins to edit the sentence.

When a number of users are waiting in line for a turn to edit the same portion of a document, the users that are lower in line may have waiting periods that are much longer than the nominal locking period. Furthermore, in different examples, either periods where editors are delayed from editing a portion of the document, or periods where editors are locked from editing a portion of the document may be implemented at the same time or individually.

File repository 142 is a central data location where editing and/or documents may be managed by file management program 300 on server computer 120. File repository 142 is stored in storage device 140, which can be local or remote to server computer 120. Some examples of management tools provided by file management program 300 include a document editor, work-item tracking, and version control (also referred to as source control or revision control). Such tools are included in previously known collaboration software. Users of client computers 130, 132, and 134 may access and edit the documents in file repository 142 as allowed by file management program 300. In other embodiments, documents and/or feedback may be stored, in addition to or alternative to being stored in file repository 142, on separate computer systems, such as client computers 130, 132, and 134.

Client computers 130, 132, and 134 include respective user interfaces (UIs) 136 for interfacing with collaborative feedback program 200 and file management program 300. UIs 136 may be web-based UIs through which users interact via a web-browser on either an attached or externally connected client computer. As each user interacts via the web browser by making edits within the document, the edits are continuously pushed up to server computer 120. Server computer 120 receives the edits inputted by all of the concurrent editors and continuously pushes down the updates within the document to client computers 130, 132 and 134 associated with each editor. In some examples, each editor observes, in near-real-time, the changes being made within the document by all of the concurrent editors. Server computer 120 and client computers 130, 132, and 134, each include respective internal components 800, and respective external components 900, as described in more detail below.

Figure 2:
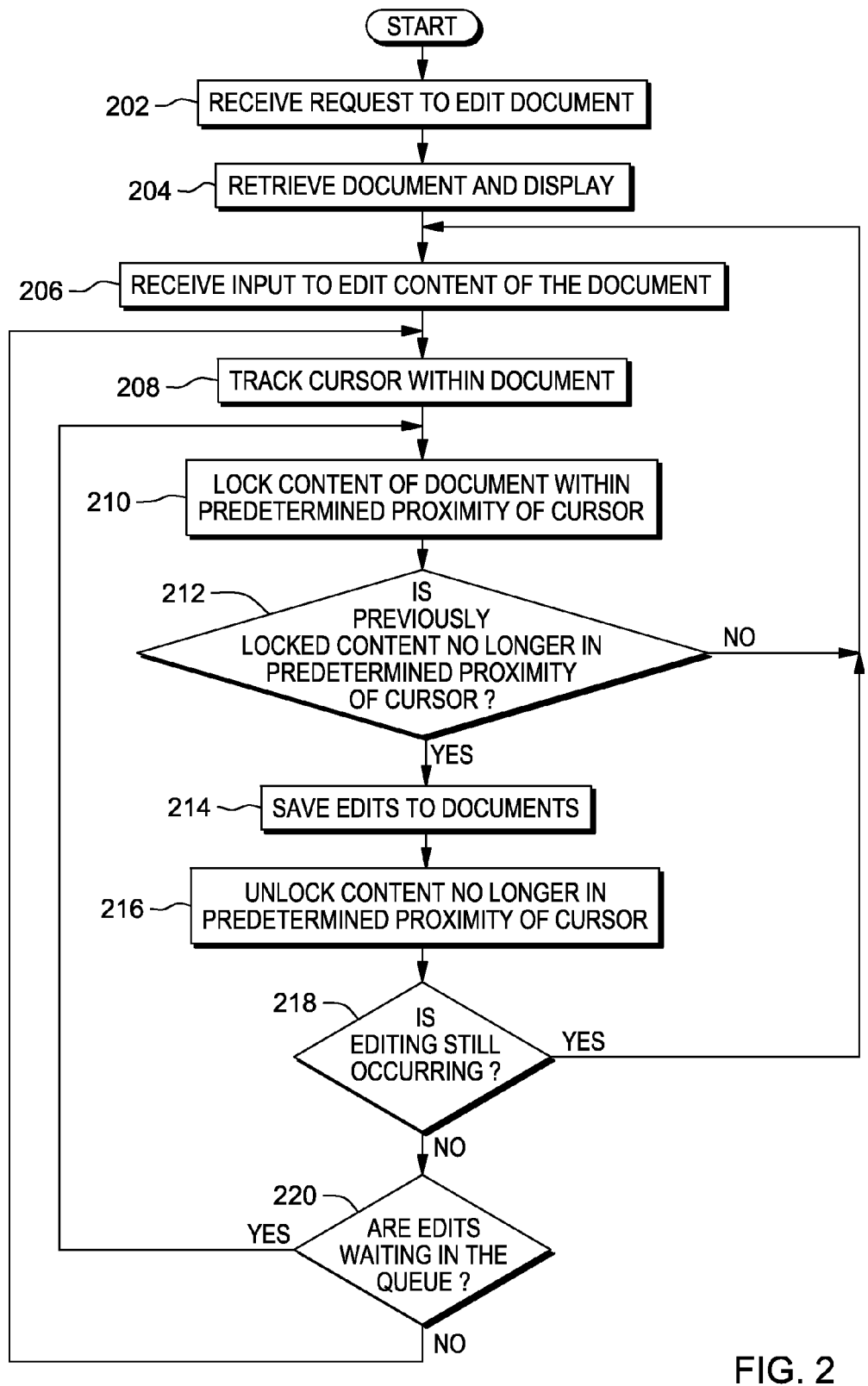
FIG. 2 is a flow chart illustrating a program installed in a computer of FIG. 1 for managing concurrent editing in a collaborative editing environment.

FIG. 2 is a flowchart illustrating the steps of collaborative feedback program 200 for managing concurrent editing in a collaborative editing environment.

In step 202, collaborative feedback program 200 receives a request to edit a document. In one example, collaborative feedback program 200 receives request for feedback of document through UI 136 of client computer, responsive to a selection of an editor. In step 204, collaborative feedback program 200 retrieves document from a storage device, such as file repository 142. In step 206, collaborative feedback program 200 receives input through UI 136 to edit content of the document. In step 208, collaborative feedback program 200 tracks the editing associated with a first editor within the document. In one example, collaborative feedback program 200 tracks the cursor associated with the editor within the document. In step 210, collaborative feedback program 200 locks content of the document to one or more second editors within close proximity of the editing of the first editor following one or more static or dynamic rules.

In step 212, collaborative feedback program 200 determines if the content that has been previously locked is still within close proximity of the editing of the first editor. If document feedback program 200 determines the content that has been previously locked is still within a predetermined proximity of the editing of the first editor (negative branch of decision 212), collaborative feedback program 200 loops back to step 206. If document feedback program 200 determines the content that has been previously locked is still within the predetermined proximity of the editing of the first editor (positive branch of decision 212), collaborative feedback program 200 saves the content of the document that was edited by the first editor (step 214).

In step 216, collaborative feedback program unlocks content of the document to the one or more second editors that is no longer within close proximity of the editing of the first editor. Collaborative feedback program 200 determines if the first editor is still editing the document (decision block 218). If collaborative feedback program 200 determines the first editor is still editing the document (positive branch of decision 218), collaborative feedback program 200 loops back to step 206.

If collaborative feedback program 200 determines the first editor is not still editing the document (negative branch of decision 218), collaborative feedback program determines if one or more second editors are waiting in a queue (step 220). If collaborative feedback program 200 determines that an initial second editor is waiting in the queue (positive branch of 220), collaborative feedback program 200 loops back to step 210 and locks content of the document to one or more second editors, exclusive of the initial second editor, within close proximity of the editing of the initial second editor. If collaborative feedback program 200 determines that there is not a second editor waiting in the queue (negative branch of 220), collaborative feedback program 200 loops back to step 208 and tracks the cursor of the first editor within the document.

Figure 3:
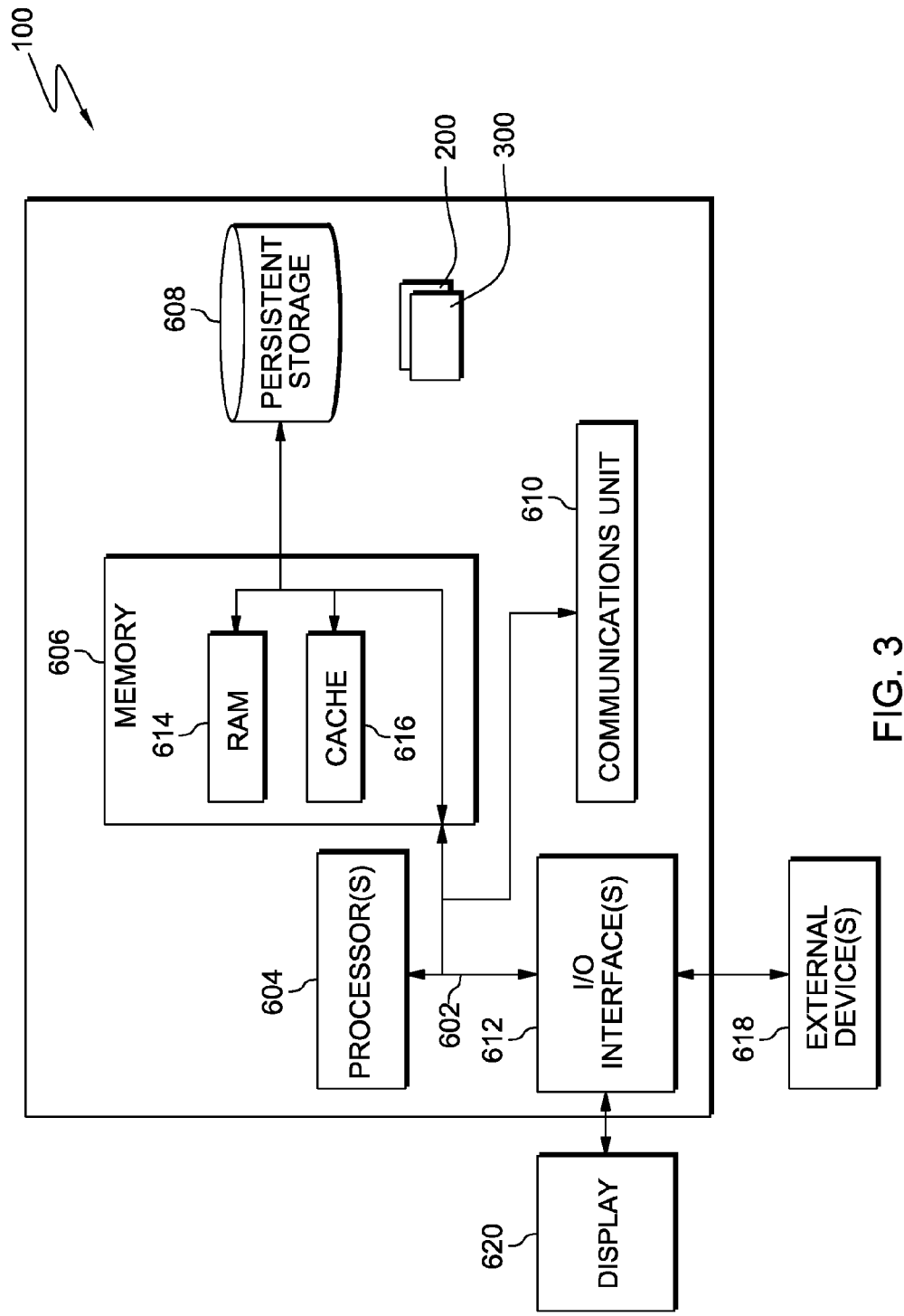
FIG. 3 depicts a block diagram of internal and external components of a document collaboration system in accordance with an illustrative embodiment.

FIG. 3 depicts a block diagram of components of document collaboration system 100 in accordance with an illustrative embodiment. It should be appreciated that FIG. 3 provides only an illustration of one implementation and does not imply any limitations with regard to the environment in which different embodiments may be implemented. Many modifications to the depicted environment may be made.

Document collaboration system 100 includes communications fabric 602, which provides communications between processor(s) 604, memory 606, persistent storage 608, communications unit 610, and input/output (I/O) interface(s) 612.

Memory 606 and persistent storage 608 are examples of computer-readable tangible storage devices. A storage device is any piece of hardware that is capable of storing information, such as, data, program code in functional form, and/or other suitable information on a temporary basis and/or permanent basis. Memory 606 may be, for example, one or more random access memories (RAM) 614, cache memory 616, or any other suitable volatile or non-volatile storage device.

Collaborative feedback program 200 and file management program 300 are stored in persistent storage 608 for execution by one or more of the respective processors 604 via one or more memories of memory 606. In the embodiment illustrated in FIG. 3, persistent storage 608 includes flash memory. Alternatively, or in addition to, persistent storage 608 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 608 may also be removable. For example, a removable hard drive may be used for persistent storage 608. Other examples include an optical or magnetic disk that is inserted into a drive for transfer onto another storage device that is also a part of persistent storage 608, or other removable storage devices such as a thumb drive or smart card.

Communications unit 610, in these examples, provides for communications with other data processing systems or devices. In these examples, communications unit 610 includes one or more network interface cards. Communications unit 610 may provide communications through the use of either or both physical and wireless communications links. In another embodiment still, document collaboration system 100 may be devoid of communications unit 610. Collaborative feedback program 200 file management program 300 may be downloaded to persistent storage 608 through communications unit 610.

I/O interface(s) 612 allows for input and output of data with other devices that may be connected to document collaboration system 100. For example, I/O interface 612 may provide a connection to external devices 618 such as a keyboard, keypad, a touch screen, and/or some other suitable input device. I/O interface(s) may also connect to a display 620.

Display 620 provides a mechanism to display data to a user and may be, for example, a computer monitor.

Based on the foregoing, a method, computer system, and computer program product have been disclosed for managing concurrent editing in a collaborative editing environment. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method for managing concurrent editing in a collaborative editing environment, the method comprising:
   receiving an input to edit an electronic document from a first editor through a first user interface;
   responsive to receiving an input to edit an electronic document, tracking a cursor within the electronic document associated with the first user interface;
   locking content of the electronic document within a proximity of the cursor associated with the first user interface to prevent access to the content of the electronic document within the proximity of the cursor by one or more second editors, wherein scope of the proximity and a length of a delay associated with the cursor are based, at least in part, on one or more dynamic rules, wherein the scope of the proximity of the cursor and the length of the delay are based, at least in part, on a nested relationship of content of the electronic document, wherein a length of the delay at a word-level is greater than a length of the delay at a sentence-level, and the length of the delay at a sentence-level is greater than a length of the delay at a paragraph-level; and
   responsive to the cursor moving to a new location within the electronic document, unlocking the content no longer in the proximity of the cursor.

2. The method of claim 1, wherein the unlocking of the content of the electronic document occurs after a first delay associated with the cursor if the first delay elapses before the content is unlocked due to the content being no longer in the proximity of the cursor.

3. The method of claim 1, wherein the unlocking of the content of the electronic document occurs after a first delay associated with the cursor if the first delay has not elapsed before the content is unlocked due to the content being no longer in the proximity of the cursor.

4. The method of claim 1, wherein the scope of the proximity of the cursor and the length of the delay are based, at least in part, on a classified type of electronic document that is being edited.

5. The method of claim 1, wherein the scope of the proximity of the cursor and the length of the delay are based, at least in part, on a number of editors that are concurrently editing the electronic document, and the scope of the proximity and the length of the delay increase as the number of editors increases.

6. The method of claim 1, further comprising:
   responsive to detecting that a first editor and a second editor are overwriting each other before either editor can complete an edit on a portion of content of the electronic document, extending a length of a delay imposed on editors editing the portion of content.

7. A computer program product for managing concurrent editing in a collaborative editing environment, the computer program product comprising:
   one or more non-transitory computer-readable storage media and program instructions stored on at least one of the one or more non-transitory computer-readable storage media, the program instructions comprising:
      program instructions to receive an input to edit an electronic document from a first editor through a first user interface;
      program instructions to track a cursor within the electronic document associated with the first user interface;
      program instructions to lock content of the electronic document within a proximity of the cursor associated with the first user interface to prevent access to the content of the electronic document within the proximity of the cursor by one or more second editors, wherein scope of the proximity and a length of a delay associated with the cursor are based, at least in part, on one or more dynamic rules, wherein the scope of the proximity of the cursor and the length of the delay are based, at least in part, on a nested relationship of content of the electronic document, wherein a length of the delay at a word-level is greater than a length of the delay at a sentence-level, and the length of the delay at a sentence-level is greater than a length of the delay at a paragraph-level; and program instructions to, responsive to the cursor moving to a new location within the electronic document, unlock the content no longer in the proximity of the cursor.

8. The program product of claim 7, wherein the unlocking of the content of the electronic document occurs after a first delay associated with the cursor if the first delay elapses before the content is unlocked due to the content being no longer in the proximity of the cursor.

9. The program product of claim 7, wherein the unlocking the content of the electronic document occurs after a first delay associated with the cursor if the first delay has not elapsed before the content is unlocked due to the content being no longer in the proximity of the cursor associated with the first editor.

10. The program product of claim 7, wherein the scope of the proximity of the cursor and the length of the delay are based, at least in part, on a classified type of electronic document that is being edited.

11. The program product of claim 7, wherein the scope of the proximity of the cursor and the length of the delay are based, at least in part, on a number of editors that are concurrently editing the electronic document, and the scope of the proximity and the length of the delay increase as the number of editors increases.

12. The computer program product of claim 7, wherein the program instructions stored on at least one of the one or more non-transitory computer-readable storage media further comprise:

program instructions to, responsive to detecting that a first editor and a second editor are overwriting each other before either editor can complete an edit on a portion of content of the electronic document, extend a length of a delay imposed on editors editing the portion of content.

13. A computer system for managing concurrent editing in a collaborative editing environment, the computer system comprising:

one or more processors, one or more computer-readable memories and one or more computer-readable storage media, and program instructions, stored on at least one of the one or more storage media for execution by at least one of the one or more processors via at least one of the one or more computer-readable memories, the program instructions comprising:

program instructions to receive an input to edit an electronic document from a first editor through a first user interface;

program instructions to track a cursor within the electronic document associated with the first user interface;

program instructions to lock content of the electronic document within a proximity of the cursor associated with the first user interface to prevent access to the content of the electronic document within the proximity of the cursor by one or more second editors, wherein scope of the proximity and a length of a delay associated with the cursor are based, at least in part, on one or more dynamic rules, wherein the scope of the proximity of the cursor and the length of the delay are based, at least in part, on a nested relationship of content of the electronic document, wherein a length of the delay at a word-level is greater than a length of the delay at a sentence-level, and the length of the delay at a sentence-level is greater than a length of the delay at a paragraph-level; and program instructions to, responsive to the cursor moving to a new location within the electronic document, unlock the content no longer in the proximity of the cursor.

14. The computer system of claim 13, wherein the unlocking of the content of the electronic document occurs after a delay associated with the cursor if the delay elapses before the content is unlocked due to the content being no longer in the proximity of the cursor.

15. The computer system of claim 13, wherein the unlocking of the content of the electronic document occurs after a delay associated with the cursor if the delay has not elapsed before the content is unlocked due to the content being no longer in the proximity of the cursor.

16. The computer system of claim 13, the scope of the proximity of the cursor and the length of the delay are based, at least in part, on a classified type of electronic document that is being edited.

17. The computer system of claim 13, wherein the scope of the proximity of the cursor and the length of the delay are based, at least in part, on a number of editors that are concurrently editing the electronic document, and the scope of the proximity and the length of the delay increase as the number of editors increases.

* * * * *